US008188696B2

(12) United States Patent
Shimizu

(10) Patent No.: US 8,188,696 B2
(45) Date of Patent: May 29, 2012

(54) MOTOR DRIVE CIRCUIT AND A METHOD FOR DRIVING A MOTOR

(75) Inventor: Tatsuro Shimizu, Kyoto (JP)

(73) Assignee: Rohm Co., Ltd. (JP)

( * ) Notice: Subject to any disclaimer, the term of this patent is extended or adjusted under 35 U.S.C. 154(b) by 310 days.

(21) Appl. No.: 12/691,846

(22) Filed: Jan. 22, 2010

(65) Prior Publication Data

US 2011/0031917 A1    Feb. 10, 2011

(30) Foreign Application Priority Data

Jan. 23, 2009   (JP) .................................. 2009-013639
Dec. 24, 2009   (JP) .................................. 2009-291900

(51) Int. Cl.
*H02P 6/18*   (2006.01)
*G11B 21/02*   (2006.01)

(52) U.S. Cl. ................. 318/400.34; 318/400.29; 360/75; 702/85

(58) Field of Classification Search ............. 318/400.26, 318/400.27, 400.28, 400.29, 400.32, 400.34, 318/293, 294, 674, 254.2, 535; 360/75, 78.04; 702/85
See application file for complete search history.

(56) References Cited

U.S. PATENT DOCUMENTS 5,844,743 A * 12/1998 Funches ...................... 360/78.04
7,576,939 B2 * 8/2009 Ooi et al. ....................... 360/75
7,728,539 B2 * 6/2010 Smith et al. .............. 318/400.34
2007/0195448 A1 * 8/2007 Xie et al. ......................... 360/75
2007/0282551 A1 * 12/2007 Harmer et al. .................. 702/94
2009/0128946 A1 * 5/2009 Ooi et al. ......................... 360/75
2010/0182715 A1 * 7/2010 Harmer ........................... 360/75

FOREIGN PATENT DOCUMENTS

JP           2000-166285 A      6/2000

* cited by examiner

*Primary Examiner* — Eduardo Colon Santana
(74) *Attorney, Agent, or Firm* — Cantor Colburn LLP

(57) ABSTRACT

A motor drive circuit includes an H-bridge circuit, voltage difference detection circuit, calibration circuit, back electromotive voltage detection circuit, control circuit, and calibration value acquisition circuit. The H-bridge circuit is connected to a DC motor. The voltage difference detection circuit outputs terminal voltage according to voltage difference occurring between both terminals of the DC motor. The calibration circuit outputs calibration voltage according to the resistance component. The back electromotive voltage detection circuit outputs voltage according to the difference between the terminal voltage and the calibration voltage, as detection voltage indicating back electromotive voltage. The control circuit drives the H-bridge circuit by pulse width modulation. The calibration circuit calibrates voltage drop occurring at the ON resistance of the low-side transistor using a calibration value that corresponds to the ratio between the resistance component and the ON resistance of the low-side transistor, and outputs calibration voltage which corresponds to the resistance component.

11 Claims, 4 Drawing Sheets

MOTOR DRIVE CIRCUIT AND A METHOD FOR DRIVING A MOTOR

BACKGROUND OF THE INVENTION

1. Field of the Invention

The present invention relates to a motor driving technique, and particularly to a control technique for the rotational speed of a motor.

2. Description of the Related Art

It is known that, when a motor such as a DC motor or a spindle motor is rotated, back electromotive voltage occurs in the motor according to its rotational speed (e.g., see Patent Document 1). Heretofore, a bridge control method has been used in which the back electromotive voltage is detected and used to control the rotation of a motor (e.g., in a cassette tape device, etc.). However, other methods using Hall sensors or speed sensors are typically employed for the reason that a method using back electromotive voltage has various disadvantages such as poor voltage use efficiency, changes in the resistance of the motor coil according to the temperature, and poor precision. However, there is still satisfactory usage value in such a method using back electromotive voltage in an arrangement that does not require high precision.

[Patent Document 1]
  Japanese Patent Application Laid Open No. 2000-166285

SUMMARY OF THE INVENTION

In view of such a situation, the present inventor has recognized the following problem.

The voltage difference between both terminals of a coil of a motor also contains a voltage drop due to the resistance component of the coil, in addition to the back electromotive voltage. Accordingly, it is difficult to use this voltage difference as it is for the back electromotive voltage.

The present invention has been made in view of such a situation. Accordingly it is an exemplary purpose of the present invention to provide a motor driving technique for suitably detecting the back electromotive voltage.

An embodiment of the present invention relates to a motor drive circuit. The motor drive circuit comprises: an H-bridge circuit including two sets of a high-side transistor and a low-side transistor, connected in series between a power terminal and a ground terminal, the H-bridge circuit being connected to a motor to be driven; a voltage difference detection circuit configured to output a terminal voltage that corresponds to a voltage difference that occurs between both terminals of the motor; a calibration circuit configured to calibrate a voltage drop that occurs at the ON resistance of one transistor selected from among the high-side transistor and the low-side transistor arranged on a path via which driving current is applied to the motor, using a calibration value that corresponds to the ratio between the resistance component of the motor and the ON resistance of the transistor thus selected, and to output the result as a calibration voltage that corresponds to the voltage drop that occurs due to the resistance component of the motor; a back electromotive voltage detection circuit configured to output a voltage that corresponds to the difference between the terminal voltage and the calibration voltage, as a detection voltage which indicates the back electromotive voltage that occurs at the motor; and a control circuit configured to drive the H-bridge circuit by pulse modulation such that the rotational speed of the motor that corresponds to the detection voltage approaches a designated rotational speed.

With such an embodiment, the calibration voltage that corresponds to the voltage drop that occurs due to the resistance component of the motor can be subtracted from the terminal voltage. Thus, such an embodiment is capable of obtaining a detection voltage which indicates the back electromotive voltage that occurs at the motor.

Also, a first transistor may be selected from among the high-side transistor and the low-side transistor arranged on a path via which the driving current is applied to the motor in the direction of a first polarity, and a second transistor may be selected from among the high-side transistor and the low-side transistor arranged on a path via which the driving current is applied to the motor in the direction of a second polarity that differs from the first polarity. With such an arrangement, when the driving current is applied to the motor in the direction of the first polarity, the calibration circuit may calibrate the voltage drop that occurs at the ON resistance of the first transistor using a first calibration value that corresponds to the ratio between the resistance component of the motor and the ON resistance of the first transistor, and may output the result as a calibration voltage that corresponds to the voltage drop that occurs due to the resistance component of the motor. Also, when the driving current is applied to the motor in the direction of the second polarity, the calibration circuit may calibrate the voltage drop that occurs at the ON resistance of the second transistor using a second calibration value that corresponds to the ratio between the resistance component of the motor and the ON resistance of the second transistor, and may output the result as a calibration voltage that corresponds to the voltage drop that occurs due to the resistance component of the motor.

With such an arrangement, the state in which the driving current is applied to the motor in the direction of the first polarity and the state in which the driving current is applied to the motor in the direction of the second polarity can each be subjected to corresponding different calibrations.

Also, the control circuit may acquire, as a voltage which indicates the driving current applied to the motor, the voltage drop that occurs at the ON resistance of one transistor selected from among the high-side transistor and the low-side transistor arranged on the path via which the driving current is applied to the motor, and may use the voltage thus acquired to perform a current feedback control operation.

With such an arrangement, there is no need to provide an additional resistor used to detect the current.

Also, when the calibration value is acquired, the control circuit may drive the H-bridge circuit by pulse modulation in a state in which the motor does not rotate such that the voltage drop that occurs at the ON resistance of the transistor thus selected becomes equal to a known reference voltage. Also, the motor drive circuit may further comprise a calibration value acquisition circuit configured to output a value that corresponds to the ratio between the terminal voltage and the reference voltage, as the calibration value to the calibration circuit when the calibration value is to be acquired.

With such an arrangement, there is no need to set a calibration value, to be used to perform the calibration, from an external circuit.

Another embodiment of the present invention relates to a motor driving method. The method is a motor driving method for driving a motor connected to an H-bridge circuit including two sets of a high-side transistor and a low-side transistor connected in series between a power terminal and a ground terminal. The motor driving method comprises: measuring a terminal voltage that corresponds to a voltage difference that occurs between both terminals of the motor; calibrating voltage drop that occurs at the ON resistance of one transistor selected from among the high-side transistor and the low-side transistor arranged on a path via which a driving current is applied to the motor using a calibration value that corresponds to the ratio between the resistance component of the motor and the ON resistance of the transistor thus selected, thereby obtaining a calibration voltage that corresponds to the voltage drop that occurs due to the resistance component of the motor; acquiring a voltage that corresponds to the difference between the terminal voltage and the calibration voltage as a detection voltage which indicates a back electromotive voltage that occurs at the motor; and driving the H-bridge circuit by pulse modulation such that the rotational speed of the motor which corresponds to the detection voltage approaches the designated rotational speed.

With such an embodiment, the calibration voltage that corresponds to the voltage drop that occurs due to the resistance component of the motor can be subtracted from the terminal voltage. Thus, such an embodiment is capable of obtaining a detection voltage which indicates the back electromotive voltage that occurs at the motor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
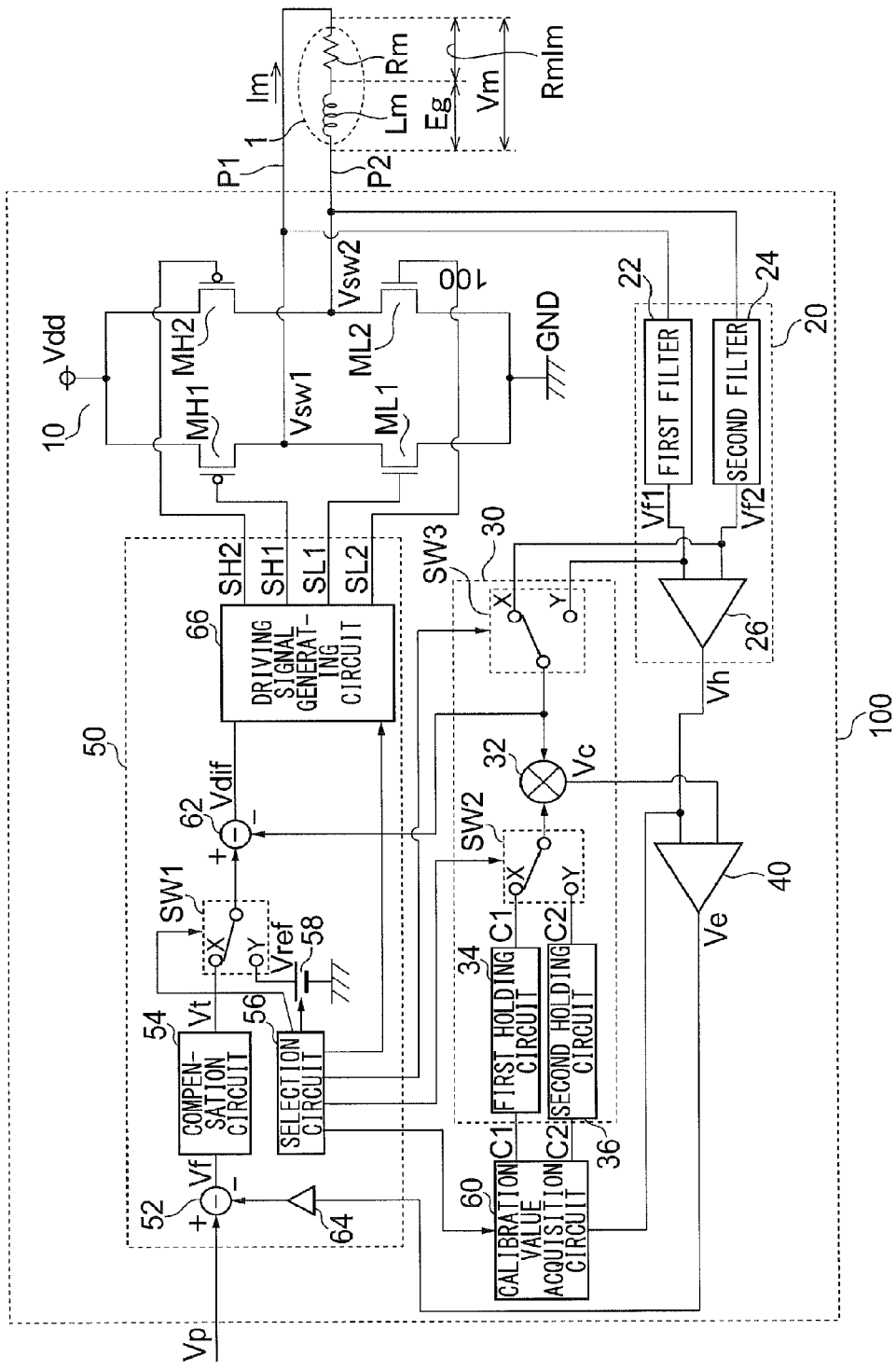
FIG. 1 is a circuit diagram which shows a configuration of a motor drive circuit according to an embodiment and a DC motor driven by the motor drive circuit.

The present invention will now be described based on preferred embodiments with reference to the accompanying drawings. The same or equivalent constituents, members, or processes illustrated in each drawing will be denoted with the same reference numerals, and the duplicative descriptions thereof are appropriately omitted. The preferred embodiments do not intend to limit the scope of the invention but exemplify the invention. All of the features and the combinations thereof described in the embodiments are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

An embodiment according to the present invention relates to a motor drive circuit configured to drive a DC motor, which is suitably employed as a driving circuit for a DC motor which moves a lens of a digital still camera, for example. Also, the embodiment according to the present invention is suitably applied to a driving circuit for a DC motor used to move a pickup head unit included in a reading/writing apparatus for an optical disk such as a CD (Compact Disc), a DVD (Digital Versatile Disc), etc.

With the motor drive circuit according to the embodiment, the ratio between the resistance component of a DC motor and the ON resistance of a low-side transistor of an H-bridge circuit is obtained beforehand. Subsequently, the voltage drop that occurs due to the resistance component of the low-side transistor is calculated by multiplying the voltage drop that occurs at the ON resistance of the DC motor in the rotating state by the ratio thus obtained. Furthermore, the back electromotive voltage that occurs at the DC motor is calculated by subtracting the voltage drop thus calculated from the voltage that occurs at both terminals of the DC motor. The control operation is performed such that the rotational speed or the rotational frequency of the motor indicated by the back electromotive voltage thus obtained approaches a designated rotational speed.

FIG. 1 is a circuit diagram which shows a configuration of a motor drive circuit 100 according to the embodiment and a DC motor 1 driven by the motor drive circuit 100. The motor drive circuit 100 includes an H-bridge circuit 10, a voltage difference detection circuit 20, a calibration circuit 30, a back electromotive voltage detection circuit 40, a control circuit 50, and a calibration value acquisition circuit 60. The motor drive circuit 100 receives an indicating voltage Vp which indicates the designated rotational speed. The motor drive circuit 100 applies, to a terminal of the DC motor 1, a driving voltage which has been pulse modulated such that the rotational speed of the DC motor 1 approaches the designated rotational speed. The motor drive circuit 100 is monolithically integrated as an function IC on a single semiconductor substrate.

The DC motor 1 includes a coil connected to a first terminal P1 and a second terminal P2 thereof. In order to simplify description, the coil is represented by an equivalent circuit in FIG. 1. The coil includes a resistance component Rm (the symbol of a resistor will also represent its resistance value) and an inductive component Lm. When a driving current (the current value is represented by Im) flows through the coil of the DC motor 1, a voltage drop (Rm·Im) occurs between the first terminal P1 and the second terminal P2 of the DC motor 1 due to the resistance component Rm. Furthermore, when the DC motor 1 is rotated, back electromotive voltage Eg occurs between the first terminal P1 and the second terminal P2 due to the rotation thereof and the inductive component Lm. That is to say, the voltage difference Vm that occurs between both terminals of the DC motor 1 is represented by the following Expression (1).

$$Vm = Rm \cdot Im + Eg. \quad \text{(Expression 1)}$$

The H-bridge circuit 10 includes a first high-side transistor MH1 and a first low-side transistor ML1 connected in series between the power supply voltage Vdd and the ground electric potential (0 V). Furthermore, the H-bridge circuit 10 includes a second high-side transistor MH2 and a second low-side transistor ML2 connected in series between the power supply voltage Vdd and the ground electric potential. In the present embodiment, each of the first high-side transistor MH1 and the second high-side transistor MH2 is a P-channel MOSFET. On the other hand, each of the first low-side transistor ML1 and the second low-side transistor ML2 is an N-channel MOSFET. Also, all the transistors may be provided as N-channel MOSFETs. Also, all the transistors may be provided as bipolar transistors.

A first switching voltage Vsw1 at a connection node between the first high-side transistor MH1 and the first low-side transistor ML1 is applied to the first terminal P1 of the DC motor 1.

The ON/OFF operation of the first high-side transistor MH1 and the ON/OFF operation of the first low-side transistor ML1 are respectively controlled according to a first high-side driving signal SH1 and a first low-side driving signal SL1, which are applied to the gates of the respective transistors.

Similarly, a second switching voltage Vsw2 at a connection node between the second high-side transistor MH2 and the second low-side transistor ML2 is applied to the second terminal P2 of the DC motor 1.

The ON/OFF operation of the second high-side transistor MH2 and the ON/OFF operation of the second low-side transistor ML2 are controlled according to a second high-side driving signal SH2 and a second low-side driving signal SL2, respectively, each of which is applied to the gate of the corresponding transistor.

With the present embodiment, the direction of the driving current that flows through the coil of the DC motor 1 when the DC motor 1 is driven by the ON/OFF operation of the first high-side transistor MH1 and the second low-side transistor ML2 corresponds to the forward rotation direction. When the driving voltage flows through the DC motor 1 in the state in which both the first high-side transistor MH1 and the second low-side transistor ML2 are turned on, the first switching voltage Vsw1 is equal to a value obtained by subtracting the voltage drop that occurs at the ON resistance of the first high-side transistor MH1 from the power supply voltage Vdd. Moreover, the second switching voltage Vsw2 is equal to the voltage drop ($R_{ML2} \cdot Im$) that occurs at the ON resistance $R_{ML2}$ of the second low-side transistor ML2.

The direction of the driving current that flows through the coil of the DC motor 1 when the DC motor 1 is driven by the ON/OFF operation of the second high-side transistor MH2 and the first low-side transistor ML1 corresponds to the reverse rotation direction. Regardless of the rotation direction, i.e., the forward rotation direction or the reverse rotation direction, the rotational speed of the DC motor 1 is controlled by performing pulse modulation of the driving signal used to drive the transistors.

The voltage difference detection circuit 20 outputs a terminal voltage Vh that corresponds to the voltage difference Vm between both the terminals P1 and P2 of the DC motor 1. The voltage difference detection circuit 20 includes a first filter 22, a second filter 24, and a differential amplifier 26. The first switching voltage Vsw1 applied to the first terminal P1 of the DC motor 1 is input to the first filter 22. The first filter 22 smoothes the first switching voltage Vsw1 if it has been pulse width modulated, so as to output a first smoothed voltage Vf1 that corresponds to the amplitude of the first switching voltage Vsw1. The second filter 24 smoothes the second switching voltage Vsw2 if it has been pulse width modulated, so as to output a second smoothed voltage Vf2 that corresponds to the amplitude of the second switching voltage Vsw2.

The differential amplifier 26 receives the first smoothed voltage Vf1 and the second smoothed voltage Vf2, and outputs the terminal voltage Vh which corresponds to the difference between the first smoothed voltage Vf1 and the second smoothed voltage Vf2.

When the driving current flows through the DC motor 1 in the forward rotation direction, the calibration circuit 30 calibrates voltage drop that occurs at the ON resistance $R_{ML2}$ of the second low-side transistor ML2 using a first calibration value C1 that corresponds to the ratio between the resistance component Rm of the DC motor 1 and the ON resistance $R_{ML2}$ of the second low-side transistor ML2, and outputs the voltage thus calibrated as a calibration voltage Vc that corresponds to the voltage drop that occurs due to the resistance component Rm of the DC motor 1. When the driving current flows through the DC motor 1 in the reverse rotation direction, the calibration circuit 30 calibrates voltage drop that occurs at the ON resistance $R_{ML1}$ of the first low-side transistor ML1 using a second calibration value C2 that corresponds to the ratio between the resistance component Rm of the DC motor 1 and the ON resistance $R_{ML1}$ of the first low-side transistor ML1, and outputs the voltage thus calibrated as the calibration voltage Vc that corresponds to the voltage drop that occurs due to the resistance component Rm of the DC motor 1.

The calibration circuit 30 includes a third switch SW3, a multiplier 32, a second switch SW2, a first holding circuit 34, and a second holding circuit 36.

The third switch SW3 is controlled by a selection circuit 56 described later, and selects either the first smoothed voltage Vf1 (Y side in FIG. 1) or the second smoothed voltage Vf2 (X side in FIG. 1). When the driving current flows through the DC motor 1 in the forward rotation direction, the third switch SW3 selects the second smoothed voltage Vf2. On the other hand, when the driving current flows through the DC motor 1 in the reverse rotation direction, the third switch SW3 selects the first smoothed voltage Vf1. That is to say, the third switch SW3 selects the voltage that corresponds to the voltage drop that occurs at the ON resistance of the corresponding low-side transistor.

The first holding circuit 34 holds the first calibration value C1, which corresponds to the value of a fraction ($Rm/R_{ML2}$) with the resistance component Rm of the DC motor 1 as the numerator and the ON resistance $R_{ML2}$ of the second low-side transistor ML2 as the denominator, which are acquired by the calibration value acquisition circuit 60 in a calibration mode described later. The second holding circuit 36 holds the second calibration value C2, which corresponds to the value of a fraction ($Rm/R_{ML1}$) with the resistance component Rm of the DC motor 1 as the numerator and the ON resistance $R_{ML1}$ of the first low-side transistor ML1 as the denominator, which are acquired by the calibration value acquisition circuit 60 in the calibration mode described later.

The second switch SW2 is controlled by the selection circuit 56 described later, and selects either of the two calibration values, i.e., the first calibration value C1 (X side in FIG. 1) or the second calibration value C2 (Y side in FIG. 1). When the driving current flows through the DC motor 1 in the forward rotation direction, the second switch SW2 selects the first calibration value C1, and when the driving current flows through the DC motor 1 in the reverse rotation direction, the second switch SW2 selects the second calibration value C2.

The multiplier 32 multiplies the voltage thus selected by the second switch SW2 by the voltage selected by the third switch SW3, and outputs the resulting signal as the calibration voltage Vc. When the driving current flows through the DC motor 1 in the forward rotation direction, the third switch SW3 selects the second smoothed voltage Vf2, i.e., the voltage that corresponds to the voltage drop ($R_{ML2} \cdot Im$) that occurs at the ON resistance $R_{ML2}$ of the second low-side transistor ML2. Furthermore, the second switch SW2 selects the first calibration value C1, which corresponds to the value of a fraction (Rm/$R_{ML2}$) with the resistance component Rm of the DC motor 1 as the numerator and the ON resistance $R_{ML2}$ of the second low-side transistor ML2 as the denominator. Accordingly, the calibration voltage Vc obtained by multiplying the voltage selected by the second switch SW2 by the voltage selected by the third switch SW3 corresponds to the voltage drop (Rm·Im). That is to say, Vc is represented by the following Expression.

$$Vc=(R_{ML2}\cdot Im)\cdot(Rm/R_{ML2})=Rm\cdot Im \qquad \text{(Expression 2)}$$

Similarly, when the driving current flows in the reverse rotation direction, the calibration voltage Vc corresponds to the voltage drop that occurs due to the resistance component Rm of the DC motor 1.

The multiplier 32 may be an amplifier which amplifies the voltage selected by the third switch SW3 with a gain that corresponds to a calibration value held by the calibration value holding circuit.

The back electromotive voltage detection circuit outputs the voltage that corresponds the difference between the terminal voltage Vh and the calibration voltage Vc as a detection voltage Ve which indicates the back electromotive voltage Eg that occurs at the DC motor 1. As described above, the calibration voltage Vc corresponds to the voltage drop (Rm·Im) that occurs due to the resistance component Rm of the DC motor 1. Furthermore, the terminal voltage Vh corresponds to the voltage difference Vm between the first terminal P1 and the second terminal P2 of the DC motor 1, and contains the voltage drop (Rm·Im) that occurs due to the resistance component Rm of the DC motor 1 and the back electromotive voltage Eg that occurs at the DC motor 1 when the DC motor 1 is rotated. Accordingly, by subtracting the calibration voltage Vc from the terminal voltage Vh, the voltage drop (Rm·Im) that occurs due to the resistance component of the DC motor 1 is canceled out, thereby obtaining the back electromotive voltage Eg that occurs at the DC motor 1 as the remainder. That is to say, the back electromotive voltage Eg is obtained as follows.

$$Vh-Vc=Vm-Rm\cdot Im=Rm\cdot Im+Eg-Rm\cdot Im=Eg \qquad \text{(Expression 3)}$$

The control circuit 50 receives the detection voltage Ve and the indicating voltage Vp which indicates the designated rotational speed, and generates the first high-side driving signal SH1, the second high-side driving signal SH2, the first low-side driving signal SL1, and the second low-side driving signal SL2 for driving the H-bridge circuit 10 by means of pulse-width modulation such that the rotational speed of the DC motor 1 that corresponds to the detection voltage Ve approaches the rotational speed designated by the indicating voltage Vp. Furthermore, the control circuit 50 acquires, as a voltage that indicates the driving current that flows through the DC motor 1, the voltage selected by the third switch SW3, i.e., the voltage that corresponds to the voltage drop that occurs at the ON resistance of the low-side transistor, and uses the voltage thus acquired to perform the current feedback control operation.

The control circuit 50 includes a first subtractor 52, a compensation circuit 54, a selection circuit 56, a reference voltage source 58, a first switch SW1, a second subtractor 62, a buffer 64, and a driving signal generating circuit 66.

The first subtractor 52 outputs a frequency difference voltage Vf which corresponds to the difference between the indicating voltage Vp and the detection voltage obtained via the buffer 64 by multiplying the detection voltage Ve by a coefficient suitable for comparing it to the indicating voltage Vp. The frequency difference voltage Vf is converted by the compensation circuit 54 into a target voltage Vt which indicates the target value of the driving current. The compensation circuit 54 adjusts the target voltage Vt such that the frequency difference voltage Vf approaches a value that corresponds to a state in which there is no difference between the designated rotational speed and the actually measured rotational speed based upon the back electromotive voltage Eg. In an example shown in FIG. 1, the target voltage Vt is changed such that the frequency difference voltage Vf becomes smaller. The compensation circuit 54 is configured using known techniques, examples of which include PI (Proportional Integral) compensators etc.

The first switch SW1 is controlled by the selection circuit 56 described later, and selects either one of two voltages, i.e., the target voltage Vt and the reference voltage Vref output from the reference voltage source 58. In the normal operation mode, the first switch SW1 selects the target voltage Vt. On the other hand, in the calibration mode described later, the first switch SW1 selects the reference voltage Vref.

The second subtractor 62 outputs, to the driving signal generating circuit 66, a difference voltage Vdif that corresponds to the difference between the voltage selected by the first switch SW1 and the voltage selected by the third switch SW3. In the normal operation mode, the difference voltage Vdif corresponds to the difference between the target voltage Vt and the voltage that indicates the driving current flowing through the DC motor 1, i.e., the difference between the target value of the driving current and the measurement value thereof. In the calibration mode, the difference voltage Vdif corresponds to the difference between the reference voltage Vref and the voltage which indicates the driving current flowing through the DC motor 1.

The driving signal generating circuit 66 generates the first high-side driving signal SH1, the second high-side driving signal SH2, the first low-side driving signal SL1, and the second low-side driving signal SL2, which are to be used to drive the H-bridge circuit 10 by pulse-width modulation such that the difference voltage Vdif becomes smaller, i.e., such that, in the normal operation mode, the difference between the target value of the driving current and the measurement value thereof becomes smaller. More specifically, the driving signal generating circuit 66 performs the control operation such that, when the difference voltage Vdif is greater than a predetermined reference value, the driving signal generating circuit 66 increases the duty ratio of the driving voltage according to the difference between the difference voltage Vdif and the reference value, and such that, when the difference voltage Vdif is smaller than the predetermined reference value, the driving signal generating circuit 66 reduces the duty ratio of the driving voltage according to the difference between the difference voltage Vdif and the reference value.

With regard to the control circuit 50 overall, in the normal operation mode, the control operation is performed so as to reduce the difference voltage Vdif that corresponds to the difference between the voltage that indicates the driving current and the target voltage Vt that indicates the target value of the driving current, thereby performing the current feedback control operation. In this case, it should be noted that the voltage drop that occurs at the ON resistance of the low-side transistor is used as the voltage that indicates the driving current. Such an arrangement allows the number of components to be reduced as compared with other arrangements that include an additional resistor for detecting the current.

Furthermore, the control operation is performed so as to reduce the frequency difference voltage Vf, which corresponds to the difference between the designated rotational speed and the actually measured rotational speed based upon the back electromotive voltage Eg, thereby providing a feedback control operation according to the rotational speed.

The selection circuit 56 judges whether the driving current is applied to the DC motor 1 in the forward rotation direction or in the reverse rotation direction, by referring to the frequency difference voltage Vf or by receiving an instruction from an external circuit. When the driving current is to be applied in the forward rotation direction, the selection circuit 56 instructs the driving signal generating circuit 66 to drive the first high-side transistor MH1 and the second low-side transistor ML2, instructs the second switch SW2 to select the first calibration value C1, and instructs the third switch SW3 to select the second smoothed voltage Vf2. Moreover, when the driving current is to be applied in the reverse rotation direction, the selection circuit 56 instructs the driving signal generating circuit 66 to drive the second high-side transistor MH2 and the first low-side transistor ML1, instructs the second switch SW2 to select the second calibration value C2, and instructs the third switch SW3 to select the first smoothed voltage Vf1.

For a predetermined period of time, e.g., 10 ms, after the power is turned on, the selection circuit 56 instructs the motor drive circuit 100 to operate in the calibration mode. Subsequently, the selection circuit 56 instructs the motor drive circuit 100 to operate in the normal operation mode. In the calibration mode, the selection circuit 56 instructs the first switch SW1 to select the reference voltage Vref, and notifies the calibration value acquisition circuit 60 of the value of the reference voltage Vref. The selection circuit 56 sets the value of the reference voltage Vref, which is supplied from the reference voltage source 58, to a small value which is insufficient for rotating the rotor of the DC motor 1.

During the first 5 ms of the calibration mode, the selection circuit 56 instructs the driving signal generating circuit 66 to drive the first high-side transistor MH1 and the second low-side transistor ML2, and instructs the third switch SW3 to select the second smoothed voltage Vf2. Accordingly, during the first 5 ms of the calibration mode, the driving current is applied to the coil of the DC motor 1 in the forward rotation direction. Furthermore, the current feedback control operation is performed in which the voltage drop that occurs at the ON resistance $R_{ML2}$ of the second low-side transistor ML2 is fed back as information with respect to the driving current.

During the next period of 5 ms in the calibration mode, the selection circuit 56 instructs the driving signal generating circuit 66 to drive the second high-side transistor MH2 and the first low-side transistor ML1, and instructs the third switch SW3 to select the first smoothed voltage Vf1. Accordingly, during the next period of 5 ms in the calibration mode, the driving current is applied to the coil of the DC motor 1 in the reverse rotation direction. Furthermore, the current feedback control operation is performed in which the voltage drop that occurs at the ON resistance $R_{ML1}$ of the first low-side transistor ML1 is fed back as the information with respect to the driving current.

In the normal operation mode, the selection circuit 56 instructs the first switch SW1 to select the target voltage Vt.

In the calibration mode, the calibration value acquisition circuit 60 acquires the terminal voltage Vh output from the differential amplifier 26, and acquires the value of the reference voltage Vref from the selection circuit 56. Subsequently, the calibration value acquisition circuit 60 outputs, to the first holding circuit 34 as the first calibration value C1, the voltage that corresponds to the value of a fraction with the terminal voltage Vh as the numerator and the reference voltage Vref as the denominator, which were acquired in the first 5 ms of the calibration mode.

Description will be made regarding the reason why the value of a fraction with the terminal voltage Vh as the numerator and the reference voltage Vref as the denominator, described above, is equal to the value of a fraction with the resistance component Rm of the DC motor 1 as the numerator and the ON resistance $R_{ML2}$ of the second low-side transistor ML2 as the denominator.

First, in the calibration mode, the current feedback operation is performed, and accordingly, the reference voltage Vref is equal to the second smoothed voltage Vf2 (Vref=Vf2). In this state, the second smoothed voltage Vf2 can be regarded as equal to the voltage drop ($R_{ML2}$·Im) that occurs at the ON resistance $R_{ML2}$ of the second low-side transistor ML2, and accordingly, the relation Vref =$R_{ML2}$·Im holds true. Furthermore, in the calibration mode, the DC motor 1 is not rotated, and accordingly, the back electromotive voltage Eg does not occur at the DC motor 1. As a result, the terminal voltage Vh is equal to the voltage drop (Rm·Im) that occurs due to the resistance component Rm of the DC motor 1 (Vh=Rm·Im). Accordingly, the relation Vh/Vref=Rm/$R_{ML2}$ is satisfied.

The calibration value acquisition circuit 60 outputs, to the second holding circuit 36 as the second calibration value C2, the voltage that corresponds to the value of a fraction with the terminal voltage Vh as the numerator and the reference voltage Vref as the denominator, which were acquired in the next 5 ms of the calibration mode. The reason why the value of this fraction is equal to the value of a fraction with the resistance component Rm of the DC motor 1 as the numerator and the ON resistance $R_{ML1}$ of the first low-side transistor ML1 as the denominator can be seen to be the same as the explanation described above.

Description will be made regarding the operation of the motor drive circuit 100 configured as described above.

Figure 2:
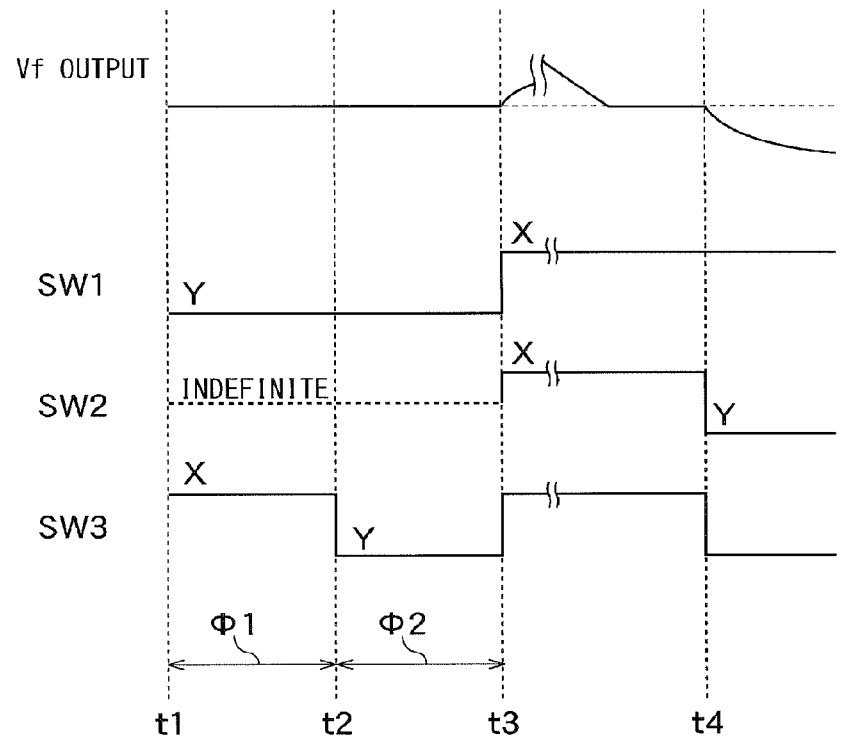
FIG. 2 is a time chart which shows the operation state of the motor drive circuit shown in FIG. 1.

FIG. 2 is a time chart which shows the operation state of the motor drive circuit 100 shown in FIG. 1. FIG. 2 shows, from the top and in the following order, the Vf output, the orientation of the selection made by the first switch SW1, the orientation of the selection made by the second switch SW2, and the orientation of the selection made by the third switch SW3.

After the power supply is turned on for the motor drive circuit 100 at the time point t1, the motor drive circuit 100 starts operation in the calibration mode. In the calibration mode, the first switch SW selects the Y side, i.e., the reference voltage Vref, and the driving current is applied to the DC motor 1 at a low level which is insufficient for rotating the rotor of the DC motor 1. Accordingly, the rotational speed of the motor is zero. During 10 ms from the time point t1 until the time point t3, the motor drive circuit 100 operates in the calibration mode. Furthermore, at the time point t2, 5 ms after the time point t1, the rotation direction is switched from the forward rotation direction to the reverse rotation direction. With such an arrangement, the period from the time point t1 until the time point t2 will be referred to as the "first calibration period φ1" for obtaining the calibration value for the forward rotation direction. The period from the time point t2 until the time point t3 will be referred to as the "second calibration period φ2" for obtaining the calibration value for the reverse rotation direction.

In the first calibration period φ1, the driving current is applied to the DC motor 1 in the forward rotation direction, and the third switch SW3 selects the X side, i.e., the second smoothed voltage Vf2 side. In the second calibration period φ2, the driving current is applied to the DC motor 1 in the reverse rotation direction, and the third switch SW3 selects the Y side, i.e., the first smoothed voltage Vf1 side.

The calibration value acquisition circuit 60 calculates the first calibration value C1 based upon the terminal voltage Vh acquired in the first calibration period φ1 and the reference voltage Vref set beforehand, and the first calibration value C1 thus calculated is held by the first holding circuit 34. Furthermore, the calibration value acquisition circuit 60 calculates the second calibration value C2 based upon the terminal voltage Vh acquired in the second calibration period φ2 and the reference voltage Vref set beforehand, and the second calibration value C2 thus calculated is held by the second holding circuit 36.

At the point in time t3, the operation mode is switched to the normal operation mode in which the driving current is applied to the DC motor 1 in the forward rotation direction. The first switch SW1 selects the target voltage Vt, the second switch SW2 selects the X side, i.e., the first calibration value C1, and the third switch SW3 selects the X side. The driving signal generating circuit 66 drives the first high-side transistor MH1 and the second low-side transistor ML2. Thus, the feedback control operation is performed such that the rotational speed indicated by the back electromotive voltage Eg that occurs at the DC motor 1 approaches the designated rotational speed.

It should be noted that, during a certain period of time after the time point t3, there is a great difference between the designated rotational speed and the actual rotational speed, and accordingly, the driving signal generating circuit 66 generates the driving signal with a full duty ratio.

At the point in time t4, with reference to the frequency difference voltage Vf detected in the motor drive circuit t100, determination is made that the driving current should be applied to the DC motor 1 in the reverse rotation direction. In this stage, the second switch SW2 selects the Y side, i.e., the first smoothed voltage Vf, and the third switch SW3 selects the Y side, i.e., the second calibration value C2. Furthermore, the driving signal generating circuit 66 drives the second high-side transistor MH2 and the first low-side transistor ML1. Thus, the feedback control operation is performed in the reverse rotation direction such that the rotational speed indicated by the back electromotive voltage Eg approaches the designated rotational speed, in the same way as in the forward rotation direction.

As described above, with the motor drive circuit 100 according to the present embodiment, in the normal operation mode, the voltage drop that occurs at the ON resistance of the low-side transistor through which the driving current flows is calibrated using the ratio between the resistance component of the DC motor 1 and the ON resistance of the low-side transistor, thereby obtaining the voltage drop that occurs due to the resistance component of the DC motor 1. With such an arrangement, the voltage drop that occurs due to the resistance component of the DC motor 1 is subtracted from the terminal voltage of the DC motor 1, thereby suitably calculating a voltage that corresponds to the back electromotive voltage Eg based upon the voltage difference that occurs between both the terminals of the DC motor 1. Furthermore, such an arrangement is capable of calculating such a voltage that corresponds to the back electromotive voltage Eg. Thus, there is no need to provide an additional sensor such as a Hall sensor for measuring the rotational speed, thereby contributing reduction in the number of components.

As another method for detecting the back electromotive voltage that occurs at the DC motor, which differs from the method according to the present embodiment, the following method can be conceived, for example. First, the resistance component of the DC motor is measured beforehand. Furthermore, a known resistor for detecting current is provided between the low-side transistor and the ground electric potential. With such an arrangement, when the DC motor is driven, the value of the driving current that flows through the DC motor is calculated based upon the voltage drop that occurs at the known resistor for detecting the current. Furthermore, the voltage drop that occurs due to the resistance component of the DC motor can be measured by multiplying the driving current thus calculated by the resistance component of the DC motor measured beforehand. Thus, the back electromotive voltage is obtained by subtracting the voltage drop thus obtained from the voltage difference between both terminals of the DC motor.

However, with the above-described method, there is a need to measure the resistance component of the DC motor beforehand. Furthermore, there is a need to provide such a known resistor for detecting the current. With the motor drive circuit 100 according to the present embodiment, the ratio between the resistance component Rm of the DC motor 1 and the ON resistance of the low-side transistor is used as the calibration value. Thus, there is no need to measure the resistance component of the DC motor beforehand, and no need to store the resistance component thus measured. Furthermore, there is no need to provide an additional known resistor for detecting current. Such an arrangement provides a simple circuit configuration, thereby reducing the number of the components.

Furthermore, with the motor drive circuit 100 according to the present embodiment, when the driving current flows through the DC motor 1 in the forward rotation direction, calibration is performed using the first calibration value C1 which corresponds to the forward rotation direction. On the other hand, when the driving current flows through the DC motor 1 in the reverse rotation direction, calibration is performed using the calibration value C2 which corresponds to the reverse rotation direction. Thus, such an arrangement is capable of compensating for the difference between the ON resistance $R_{ML1}$ of the first low-side transistor ML1 and the ON resistance $R_{ML2}$ of the second low-side transistor ML2 even if there is a great difference therebetween.

Furthermore, with the motor drive circuit 100 according to the present embodiment, the voltage drop that occurs at the ON resistance of the low-side transistor, which is selected by the third switch SW3, is utilized in the current feedback control operation as information which indicates the driving current. Thus, there is no need to provide an additional circuit for detecting the driving current, thereby reducing the circuit scale.

While the preferred embodiments of the present invention have been described using specific terms, such description is for illustrative purposes only, and it is to be understood that changes and variations may be made without departing from the spirit or scope of the appended claims.

Description has been made in the embodiment regarding an arrangement in which the first holding circuit 34 holds the first calibration value C1, the second holding circuit 36 holds the second calibration value C2, and the calibration value is switched therebetween according to the rotation direction, i.e., the forward rotation direction or the reverse rotation direction. However, the present invention is not restricted to such an arrangement. For example, in a case in which it can be assumed that there is a small difference between the ON resistance $R_{ML1}$ of the first low-side transistor ML1 and the ON resistance $R_{ML2}$ of the second low-side transistor ML2, only the first calibration value C1 which corresponds to the ratio between the resistance component Rm of the DC motor 1 and the ON resistance $R_{ML2}$ of the second low-side transistor $R_{ML2}$ may be used as the calibration value for both the forward rotation direction and the reverse rotation direction.

Figure 3:
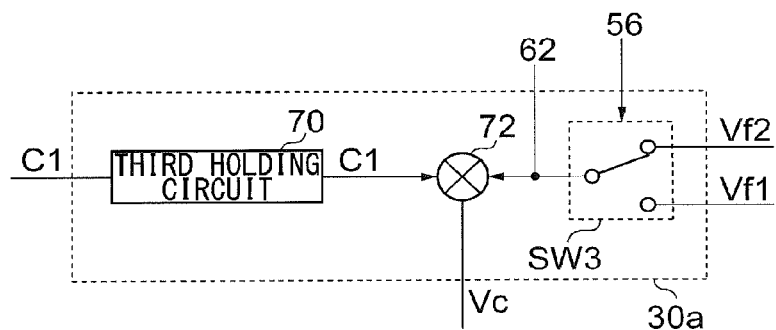
FIG. 3 is a circuit diagram which shows a configuration of a calibration circuit according to a first modification.

FIG. 3 is a circuit diagram which shows the configuration of a calibration circuit 30a according to a first modification.

The calibration circuit 30a includes a third holding circuit 70, a multiplier 72, and a third switch SW3. The third holding circuit 70 holds the first calibration value C1 which corresponds to the value of a fraction (Rm/$R_{ML2}$) with the resistance component Rm of the DC motor 1 as the numerator and the ON resistance $R_{ML2}$ of the second low-side transistor ML2 as the denominator, which are acquired by the calibration value acquisition circuit 60 in the calibration mode. The multiplier 72 multiples the voltage selected by the third switch SW3 by the first calibration value C1 held by the third holding circuit 70, and outputs the resulting voltage as the calibration voltage Vc. That is to say, the voltage selected by the third switch SW3 is calibrated using the first calibration value C1 regardless of the rotation direction, i.e., the forward rotation direction or the reverse rotation direction. Thus, the first modification reduces the number of the holding circuits which hold the calibration values, thereby reducing the circuit scale.

Description has been made in the embodiment regarding an arrangement in which the ratio between the resistance component Rm of the DC motor 1 and the ON resistance of the low-side transistor is used as the calibration value. However, the present invention is not restricted to such an arrangement. For example, the ratio between the resistance component Rm of the DC motor 1 and the ON resistance of the high-side transistor may be used as the calibration value.

Figure 4:
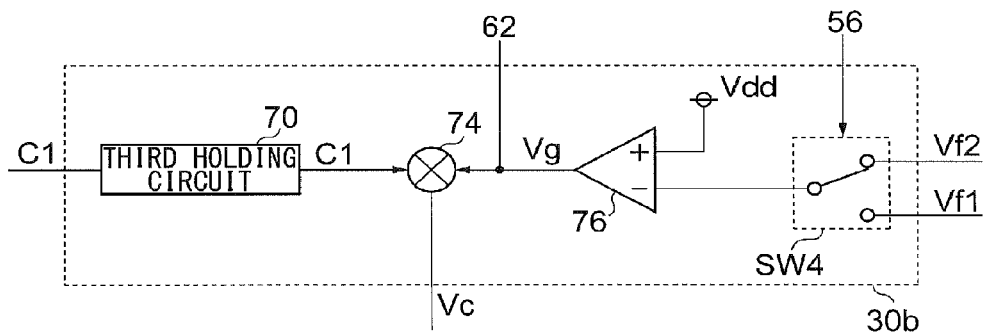
FIG. 4 is a circuit diagram which shows a configuration of a calibration circuit according to a second modification.

FIG. 4 is a circuit diagram which shows the configuration of a calibration circuit 30b according to a second modification. The calibration circuit 30b includes a third holding circuit 70, a multiplier 74, a differential amplifier 76, and a fourth switch SW4.

The fourth switch SW4 is controlled by the selection circuit 56, and selects either one of the two smoothed voltages, i.e., the first smoothed voltage Vf1 and the second smoothed voltage Vf2. When the driving current flows through the DC motor 1 in the forward rotation direction, the fourth switch SW4 selects the first smoothed voltage Vf1. On the other hand, when the driving current flows through the DC motor 1 in the reverse rotation direction, the fourth switch SW4 selects the second smoothed voltage Vf2. That is to say, the fourth switch SW4 selects a voltage that corresponds to the voltage obtained by subtracting the voltage drop that occurs at the ON resistance of the high-side transistor from the power supply voltage Vdd.

The differential amplifier 76 outputs the calibration target voltage Vg which corresponds to the difference between the power supply voltage Vdd and the voltage selected by the fourth switch SW4. The calibration target voltage Vg is a voltage that corresponds to the voltage drop that occurs at the ON resistance of the high-side transistor.

The multiplier 74 multiplies the target calibration voltage Vg by the first calibration value C1 held by the third holding circuit 70, and outputs the resulting voltage as the calibration voltage Vc.

With the second modification, the voltage drop that occurs due to the resistance component Rm of the DC motor 1 can be obtained using the voltage drop that occurs at the ON resistance of the high-side transistor. As described above, the decision of which transistor's ON resistance is used for the calibration can be made as appropriate according to the application, thereby providing a high degree of freedom in the design.

A part of the functions of the motor drive circuit 100 according to the embodiment may be realized by digital processing. For example, an arrangement may be made in which an A/D converter is provided as the input stage for the first filter 22 and the second filter 24, and the subsequent processing is provided in the form of digital processing.

Figure 5A:
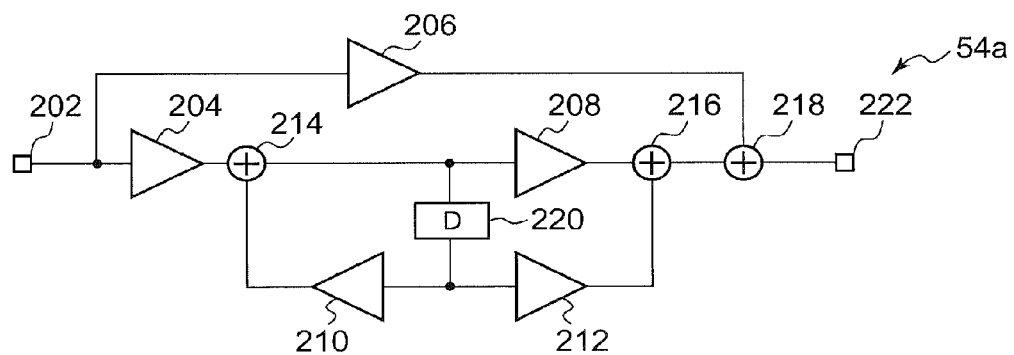
FIGS. 5A and 5B are circuit diagrams which show the configurations of compensation circuits shown in FIG. 1.
Figure 5B:
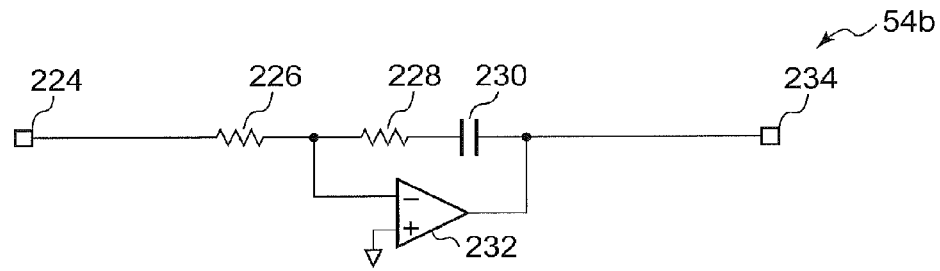

Description will be made regarding an example circuit configuration of the compensation circuit 54 of the motor drive circuit 100 according to the embodiment. FIGS. 5A and 5B are circuit diagrams whish show the configurations of the compensation circuit 54 shown in FIG. 1.

The compensation circuit 54 of the motor drive circuit 100 shown in FIG. 1 according to the embodiment may be a digital PI (proportional-integral) compensator. FIG. 5A is a circuit diagram which shows the configuration of such a digital PI compensator 54a.

The digital PI compensator 54a includes a first input terminal 202, a first multiplier 204, a second multiplier 206, a third multiplier 208, a fourth multiplier 210, a fifth multiplier 212, a first adder 214, a second adder 216, a third adder 218, a first delay element 220, and a first output terminal 222.

A digital signal which indicates the frequency difference voltage Vf is input to the first input terminal 202. In a case in which the frequency difference voltage Vf, which is output from the first subtractor 52, is provided in the form of analog voltage, the analog voltage is converted using known analog/digital conversion techniques into a digital signal which indicates the frequency difference voltage Vf. The digital signal thus converted is input to the first input terminal 202.

The first multiplier 204 and the second multiplier 206 multiply the digital signal input via the first input terminal 202 by a predetermined first coefficient and a predetermined second coefficient, respectively, and each output the resulting digital signals. The first adder 214 integrates the digital signal output from the first multiplier 204 and the digital signal output from the fourth multiplier 210, and outputs the resulting signal. The first delay element 220 is an element which delays the digital signal by one sampling cycle (one clock). The first delay element 220 delays the digital signal output from the first adder 214 by one cycle, and outputs the resulting digital signal. The fourth multiplier 210 multiplies the digital signal output from the first delay element 220 by a fourth coefficient, and outputs the resulting digital signal. The third multiplier 208 multiplies the digital signal output from the first adder 214 by a predetermined third coefficient, and outputs the resulting digital signal. The fifth multiplier 212 multiplies the digital signal output from the first delay element 220 by a predetermined fifth coefficient, and outputs the resulting digital signal. The second adder 216 integrates the digital signal output from the third multiplier 208 and the digital signal output from the fifth multiplier 212, and outputs the resulting signal.

The third adder 218 integrates the digital signal output from a proportional calculation block of the PI compensator 54a, i.e., the digital signal output from the second multiplier 206, and the digital signal output from the integral calculation block, i.e., the digital signal output from the second adder 216, and outputs the resulting signal. The first output terminal 22 is a terminal via which an external circuit receives the digital signal output from the third adder 218.

In the integral calculation block of the PI compensator 54a, the first delay element 220, the fourth multiplier 210, and the first adder 214 form a feedback circuit, and the first delay element 220, the fifth multiplier 212, and the second adder 216 form a feedforward circuit. By adjusting a fourth coefficient of the fourth multiplier 210 and/or a fifth coefficient of the fifth multiplier 212, such an arrangement adjusts the ratio between the portion contributed by the feedback circuit and the portion contributed by the feedforward circuit.

The compensation circuit 54 of the motor drive circuit 100 according to the embodiment may be an analog PI compensator. FIG. 5B is a circuit diagram which shows a configuration of an analog PI compensator 54b.

The PI compensator 54b includes a second input terminal 224, a first resistor 226, a second resistor 228, a first capacitor 230, a first operational amplifier 232, and a second output terminal 234.

The frequency difference voltage Vf output from the first subtractor 52 is input to the second input terminal 224. The first resistor 226, the second resistor 228, and the first capacitor 230 are connected in series in this order between the second input terminal 224 and the second output terminal 234. The inverting input terminal of the first operational amplifier 232 is connected to a node between the first resistor 226 and the second resistor 228. The non-inverting input terminal of the first operational amplifier 232 is grounded. The output terminal of the first operational amplifier 232 is connected to a node between the first capacitor 230 and the second output terminal 234. The second output terminal 234 is a terminal via which an output circuit receives the voltage on the output side of the first operational amplifier 232.

With the PI compensator 54b, the second resistor 228 provided on the feedback path for the first operational amplifier 232 provides the proportional portion, and the first capacitor 230 provided on the same feedback path provides the integral portion.

Figure 6A:
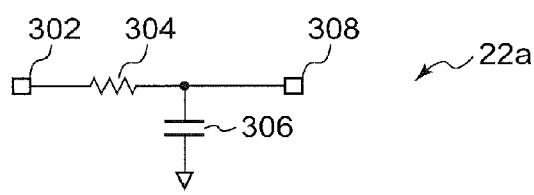
FIGS. 6A through 6C are circuit diagrams each of which shows the configuration of at least one of the first filter and the second filter shown in FIG. 1.
Figure 6B:
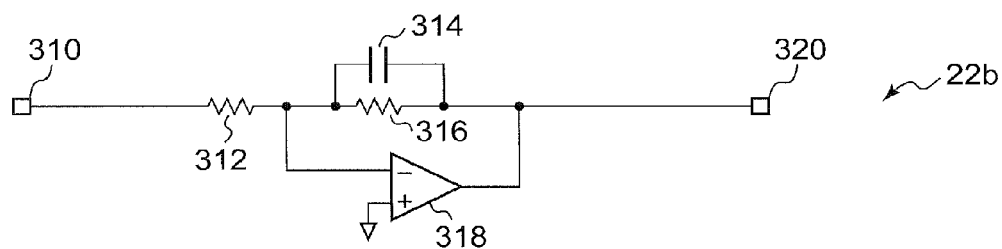
Figure 6C:
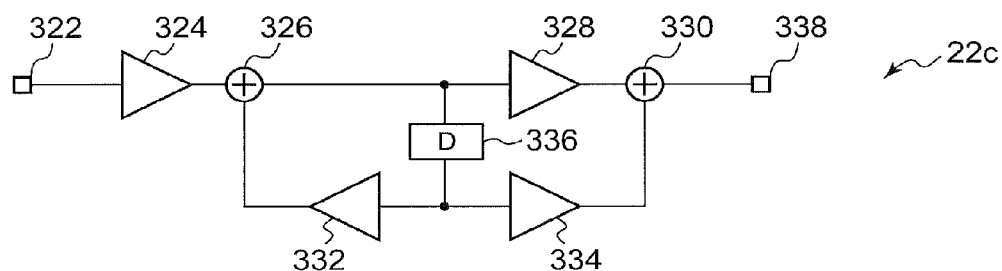

Description will be made regarding example circuit configurations of the first filter 22 and the second filter 24 included in the motor drive circuit 100 according to the embodiment. FIGS. 6A through 6C are circuit diagrams which show at least one configuration of the first filter 22 and the second filter 24 shown in FIG. 1.

The first filter 22 of the motor drive circuit 100 according to the embodiment may be an analog passive low-pass filter. FIG. 6A is a circuit diagram which shows a configuration of such an analog passive low-pass filter 22a.

The passive low-pass filter 22a includes a third input terminal 302, a third resistor 304, a second capacitor 306, and a third output terminal 308.

The first switching voltage Vsw1 to be applied to the first terminal P1 of the DC motor 1 is input to the third input terminal 302. One terminal of the third resistor 304 is connected to the third input terminal 302, and the other terminal thereof is connected to one terminal of the second capacitor 306. The other terminal of the second capacitor 306 is grounded. The voltage at one terminal of the second capacitor 306 is output via the third terminal 308.

Also, the second filter 24 may be an analog passive low-pass filter. The configuration of such a passive low-pass filter is the same as that of the aforementioned passive low-pass filter 22a.

The first filter 22 of the motor drive circuit 100 according to the embodiment may be an analog active low-pass filter. FIG. 6B is a circuit diagram which shows a configuration of such an analog active low-pass filter 22b.

The active low-pass filter 22b includes a fourth input terminal 310, a fourth resistor 312, a third capacitor 314, a fifth resistor 316, a second operational amplifier 318, and a fourth output terminal 320.

The first switching voltage Vsw1 to be applied to the first terminal P1 of the DC motor 1 is input to the fourth input terminal 310. One terminal of the fourth resistor 312 is connected to the fourth input terminal 310, and the other terminal thereof is connected to the inverting input terminal of the second operational amplifier 318. The third capacitor 314 and the fifth resistor 316 are arranged in parallel on the feedback path from the output terminal of the second operational amplifier 318 to the inverting input terminal thereof. The non-inverting input terminal of the second operational amplifier 318 is grounded. The fourth output terminal 320 is a terminal via which an external circuit receives the voltage on the output side of the second operational amplifier 318.

Also, the second filter 24 may be an analog active low-pass filter. The configuration of such an active low-pass filter is the same as that of the aforementioned active low-pass filter 22b.

The first filter 22 of the motor drive circuit 100 according to the embodiment may be a digital low-pass filter. FIG. 6C is a circuit diagram which shows a configuration of such a digital low-pass filter 22c.

The digital low-pass filter 22c includes a fifth input terminal 322, a sixth multiplier 324, a fourth adder 326, a seventh multiplier 328, a fifth adder 330, an eighth multiplier 332, a ninth multiplier 334, a second delay element 336, and a fifth output terminal 338. The low-pass filter 22c has the same configuration as that of the PI compensator 54a shown in FIG. 5A, except that the low-pass filter 22c does not include the second multiplier 206 and the third adder 218. That is to say, the sixth multiplier 324, the fourth adder 326, the seventh multiplier 328, the fifth adder 330, the eighth multiplier 332, the ninth multiplier 334, and the second delay element 336 respectively correspond to the first multiplier 204, the first adder 214, the third multiplier 208, the second adder 216, the fourth multiplier 210, the fifth multiplier 212, and the first delay element 220.

Also, the second filter 24 may be a digital low-pass filter. The configuration of such a digital low-pass filter is the same as that of the aforementioned low-pass filter 22c.

What is claimed is:
1. A motor drive circuit comprising:
an H-bridge circuit including two sets of a high-side transistor and a low-side transistor, connected in series between a power terminal and a ground terminal, the H-bridge circuit being connected to a motor to be driven;
a voltage difference detection circuit configured to output a terminal voltage that corresponds to a voltage difference that occurs between both terminals of the motor;
a calibration circuit configured to calibrate a voltage drop that occurs at the ON resistance of one transistor selected from among the high-side transistor and the low-side transistor arranged on a path via which driving current is applied to the motor, using a calibration value that corresponds to the ratio between the resistance component of the motor and the ON resistance of the transistor thus selected, and to output the result as a calibration voltage that corresponds to the voltage drop that occurs due to the resistance component of the motor;
a back electromotive voltage detection circuit configured to output a voltage that corresponds to the difference between the terminal voltage and the calibration voltage, as a detection voltage which indicates the back electromotive voltage that occurs at the motor; and
a control circuit configured to drive the H-bridge circuit by pulse modulation such that the rotational speed of the motor that corresponds to the detection voltage approaches a designated rotational speed.

2. A motor drive circuit according to claim 1, wherein a first transistor is selected from among the high-side transistor and the low-side transistor arranged on a path via which the driving current is applied to the motor in the direction of a first polarity, and a second transistor is selected from among the high-side transistor and the low-side transistor arranged on a path via which the driving current is applied to the motor in the direction of a second polarity that differs from the first polarity, and wherein, when the driving current is applied to the motor in the direction of the first polarity, the calibration circuit calibrates the voltage drop that occurs at the ON resistance of the first transistor using a first calibration value that corresponds to the ratio between the resistance component of the motor and the ON resistance of the first transistor, and outputs the result as a calibration voltage that corresponds to the voltage drop that occurs due to the resistance component of the motor, and wherein, when the driving current is applied to the motor in the direction of the second polarity, the calibration circuit calibrates the voltage drop that occurs at the ON resistance of the second transistor using a second calibration value that corresponds to the ratio between the resistance component of the motor and the ON resistance of the second transistor, and outputs the result as a calibration voltage that corresponds to the voltage drop that occurs due to the resistance component of the motor.

3. A motor drive circuit according to claim 1, wherein the control circuit acquires, as a voltage which indicates the driving current applied to the motor, the voltage drop that occurs at the ON resistance of one transistor selected from among the high-side transistor and the low-side transistor arranged on the path via which the driving current is applied to the motor, and uses the voltage thus acquired to perform a current feedback control operation.

4. A motor drive circuit according to claim 1, wherein, when the calibration value is acquired, the control circuit drives the H-bridge circuit by pulse modulation in a state in which the motor does not rotate such that the voltage drop that occurs at the ON resistance of the transistor thus selected becomes equal to a known reference voltage, and wherein the motor drive circuit further comprises a calibration value acquisition circuit configured to output a value that corresponds to the ratio between the terminal voltage and the reference voltage, as the calibration value to the calibration circuit when the calibration value is to be acquired.

5. A motor drive circuit according to claim 1, wherein the control circuit comprises:
    a first subtractor configured to output a frequency difference voltage that corresponds to the difference between the rotational speed of the motor which corresponds to the detection voltage and the designated rotational speed;
    a compensation circuit configured to generate a target voltage which indicates a target value of the driving current to be applied to the motor such that the frequency difference voltage approaches a value that corresponds to a state in which there is no difference between the rotational speed of the motor which corresponds to the detection voltage and the designated rotational speed;
    a reference voltage source configured to output a reference voltage;
    a first switch configured to select one voltage from among the target voltage and the reference voltage;
    a second subtractor configured to output a difference voltage which corresponds to the difference between the voltage selected by the first switch and the voltage which indicates the driving current that flows through the motor;
    a driving signal generating circuit configured to drive the H-bridge circuit by pulse modulation such that the difference voltage approaches a value that corresponds to a state in which there is no difference between the voltage selected by the first switch and the voltage which indicates the driving current that flows through the motor; and
    a selection circuit configured to instruct the first switch to select the reference voltage in a first mode, and to instruct the first switch to select the target voltage in a second mode.

6. A motor drive circuit according to claim 5, wherein the compensation circuit is a digital proportional-integral compensator.

7. A motor drive circuit according to claim 5, wherein the compensation circuit is an analog proportional-integral compensator.

8. A motor drive circuit according to claim 1, wherein the voltage difference detection circuit comprising:
    a first filter configured to smooth the voltage applied to one terminal of the motor; and
    a second filter configured to smooth the voltage applied to the other terminal of the motor;
    and wherein at least one of the first filter and the second filter is an analog passive low-pass filter.

9. A motor drive circuit according to claim 1, wherein the voltage difference detection circuit comprising:
    a first filter configured to smooth the voltage applied to one terminal of the motor; and
    a second filter configured to smooth the voltage applied to the other terminal of the motor;
    and wherein at least one of the first filter and the second filter is an analog active low-pass filter.

10. A motor drive circuit according to claim 1, wherein the voltage difference detection circuit comprising:
    a first filter configured to smooth the voltage applied to one terminal of the motor; and
    a second filter configured to smooth the voltage applied to the other terminal of the motor;
    and wherein at least one of the first filter and the second filter is a digital low-pass filter.

11. A motor driving method for driving a motor connected to an H-bridge circuit including two sets of a high-side transistor and a low-side transistor connected in series between a power terminal and a ground terminal, the motor driving method comprising:
    measuring a terminal voltage that corresponds to a voltage difference that occurs between both terminals of the motor;
    calibrating voltage drop that occurs at the ON resistance of one transistor selected from among the high-side transistor and the low-side transistor arranged on a path via which a driving current is applied to the motor using a calibration value that corresponds to the ratio between the resistance component of the motor and the ON resistance of the transistor thus selected, thereby obtaining a calibration voltage that corresponds to the voltage drop that occurs due to the resistance component of the motor;
    acquiring a voltage that corresponds to the difference between the terminal voltage and the calibration voltage as a detection voltage which indicates a back electromotive voltage that occurs at the motor; and
    driving the H-bridge circuit by pulse modulation such that the rotational speed of the motor which corresponds to the detection voltage approaches the designated rotational speed.

\* \* \* \* \*